(12) United States Patent
Kiddle et al.

(10) Patent No.: US 9,619,469 B2
(45) Date of Patent: Apr. 11, 2017

(54) ADAPTIVE IMAGE BROWSING

(75) Inventors: Graham R. Kiddle, Orchard Estate (GB); Joseph A. Manico, Rochester, NY (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 12/644,225

(22) Filed: Dec. 22, 2009

(65) Prior Publication Data
US 2011/0153602 A1   Jun. 23, 2011

(51) Int. Cl.
G06F 17/30 (2006.01)

(52) U.S. Cl.
CPC .. *G06F 17/30029* (2013.01); *G06F 17/30041* (2013.01); *G06F 17/30044* (2013.01); *G06F 17/30053* (2013.01); *G06F 17/30899* (2013.01)

(58) Field of Classification Search
USPC .......................... 707/731, 754, 803; 382/305
See application file for complete search history.

(56) References Cited

U.S. PATENT DOCUMENTS

| | | | |
|---|---|---|---|
| 4,972,349 A * | 11/1990 | Kleinberger | |
| 6,282,317 B1 | 8/2001 | Luo et al. | |
| 6,671,405 B1 | 12/2003 | Savakis et al. | |
| 6,804,684 B2 | 10/2004 | Stubler et al. | |
| 6,826,316 B2 | 11/2004 | Luo et al. | |
| 6,847,733 B2 | 1/2005 | Savakis et al. | |
| 7,003,139 B2 | 2/2006 | Endrikhovski et al. | |
| 7,233,684 B2 | 6/2007 | fedorovskaya et al. | |
| 7,271,809 B2 | 9/2007 | Fedorovskaya et al. | |
| 7,555,165 B2 | 6/2009 | Luo et al. | |
| 7,620,270 B2 | 11/2009 | Matraszek et al. | |
| 2001/0041020 A1* | 11/2001 | Shaffer et al. | 382/305 |
| 2001/0056415 A1* | 12/2001 | Zhu et al. | 707/1 |
| 2004/0261103 A1* | 12/2004 | Ohno et al. | 725/38 |

(Continued)

FOREIGN PATENT DOCUMENTS

| | | |
|---|---|---|
| EP | 1 089 198 | 9/1999 |
| WO | 2004/061710 | 7/2004 |

(Continued)

OTHER PUBLICATIONS

Webster's Encyclopedic Unabridged Dictionary of the English Language 1989, Random House, p. 412.*

(Continued)

*Primary Examiner* — Jason Liao
(74) *Attorney, Agent, or Firm* — Blank Rome LLP

(57) ABSTRACT

A method for browsing a collection of multimedia assets on a soft-copy display comprising: receiving a collection of multimedia assets, each multimedia asset having a set of associated metadata; defining an interest criterion; using a processor to analyze the metadata associated with the multimedia assets and rank the multimedia assets according to the interest criterion; displaying a portion of the multimedia assets on the soft-copy display according to the ranking; interactively user selecting a displayed multimedia asset using a user interface; updating the interest criterion based on the selected multimedia asset; using a processor to determine an updated ranking of the multimedia assets according to the updated interest criterion; and displaying a portion of the multimedia assets on the soft-copy display according to the updated ranking.

18 Claims, 8 Drawing Sheets

(56) References Cited

U.S. PATENT DOCUMENTS

| | | | |
|---|---|---|---|
| 2006/0155684 A1* | 7/2006 | Liu et al. .......................... 707/3 |
| 2006/0161868 A1* | 7/2006 | Van Dok et al. ............. 715/835 |
| 2007/0288432 A1* | 12/2007 | Weltman et al. ................. 707/3 |
| 2008/0025646 A1* | 1/2008 | Aguera y Arcas et al. .. 382/305 |
| 2008/0278481 A1* | 11/2008 | Aguera y Arcas et al. .. 345/419 |
| 2008/0295037 A1* | 11/2008 | Cao et al. .................... 715/852 |
| 2009/0094518 A1 | 4/2009 | Lawther et al. |
| 2009/0150147 A1* | 6/2009 | Jacoby et al. ................ 704/235 |
| 2009/0154795 A1* | 6/2009 | Tan et al. ..................... 382/155 |
| 2009/0185723 A1* | 7/2009 | Kurtz et al. .................. 382/118 |
| 2009/0192967 A1* | 7/2009 | Luo et al. ....................... 706/47 |
| 2009/0217352 A1* | 8/2009 | Shen et al. ........................ 726/3 |
| 2011/0129126 A1* | 6/2011 | Begeja et al. ................ 382/118 |

FOREIGN PATENT DOCUMENTS

| | | |
|---|---|---|
| WO | 2005/008519 | 1/2005 |
| WO | 2008/073505 | 6/2008 |

OTHER PUBLICATIONS

Metadata 2010 [captured on Aug. 5, 2014], Free On-Line Dictionary of Computing, http://foldoc.org/metadata.*

"Explore images with Google Image Swirl," http://googleblog.blogspot.com/2009/11/explore-images-with-google-image-swirl.html.

J. Urban et al., "An Adaptive Technique for Content-based Image Retrieval," Multimedia Tools and Applications vol. 31, pp. 1-28, 2006.

* cited by examiner

ADAPTIVE IMAGE BROWSING

CROSS-REFERENCE TO RELATED APPLICATIONS

Reference is made to commonly assigned, co-pending Great Britain Patent Application Serial No. 0818089.5 (PCT/EP2009/060451), entitled: "Interactive Image Selection Method", by Fry et al., which is incorporated herein by reference.

FIELD OF THE INVENTION

This invention pertains to the field of browsing collections of multimedia assets and more particularly to a method for adaptively updating an interest criteria used to create a ranked display.

BACKGROUND OF THE INVENTION

The problem with standard "search and retrieve" techniques when applied to large image collections is the underlying assumption that users "know what they are looking for" and that all of the images have been tagged with meaningful key words. This may be the case in certain situations, but more likely, users browse image collections as a form of entertainment or to reminisce and seldom take the time an effort to provide key word information. Images are typically used as an adjunct to recalling past events, enhancing social connections, or establishing new relationships where the element of discovery is essential in making the experience enjoyable.

Designating "Favorites" was an early attempt to establish that certain images, in a multimedia collection, had special significance to the user. This feature could only be used to illustrate that an image or group of images are special but does not address why they are special or provide any indications about the relationships between images image in a collection other than they are the user's "favorites" or "not favorites". Favorite status is manually assigned by a user at the time of image capture via suitably equipped cameras or while viewing images on a display device with software that provides this capability. In both cases, the user is required to make the designation manually and as multimedia content collections have grown in size, designating favorites have become increasingly less useful.

Another popular method of assigning special significance to multimedia content is to assign selected content to virtual "albums". Albums have user designated or selected themes or names that attempt to reflect the type of content associated with the album. Some systems that employ albums store content files in a folder structure within a device or assessable by a device. Other content storage and presentation systems using albums only point to the content files so that the files do not need to be physically rearranged within a storage device and can be included in multiple albums without requiring redundant storage. Both types of album systems require the user to make decisions and manual designations that become increasingly burdensome for casual users as image collections have grown is size.

Another method of accessing multimedia content collections is by using searching algorithms. Text based searches require that keywords have already been assigned to images and tend to focus people down to specific images or categories of images, where the activity gets stuck, not necessarily at a point the user wanted to get to. It also reduces the possibility of serendipitous discovery and side tracking behavior. "Search and retrieve" techniques often makes interacting with images feel more like work and less like the enjoyable browsing type of behavior people typically undertook with a shoebox of images, where being sidetracked was part of the entertaining experience.

U.S. Patent Application Publication No. 2009/0094518 to Lawther et al., entitled "Method For Image Animation Using Image Value Rules," teaches a method for image presentation, where the display is animated in a manner to attract attention to images determined to have a higher image value score. No provision is made for adjusting the images that are included in the image presentation according to a user-specified interest criterion in order to enable an active browsing experience.

European Patent Application 1089198 Wong entitled "Content-Based Image Searching" discloses a hierarchical method to derive a content-based image tree from an image database. The method partitions the set of multiple images into a first subset and a second subset by allocating images to each subset whose feature metrics are closer to a feature metric of a seed image in each respective subset. For each subset, a comparison image is determined whose feature metric is representative of feature metrics of images partitioned into the respective subsets. This process is recursively repeats for each subset, and for subsets of each subset, etc., to create a tree of partitioned subsets of images. The method then enables a search based on the comparison images.

International Patent Application WO 2008/073505 to Marques et al. entitled "System and Methods of Image Retrieval" discloses a visual image retrieval system. A preprocessor communicatively linked to an image database segments the images and determines a regions-of-interest. A perceptually-relevant image search machine interface is used to display query images and retrieve images in response to a user selecting at least one displayed query image.

International Patent Application WO 2005/008519 to Zheng et al. entitled "Combined Search Method for Content-Based Image Retrieval" discloses a method for performing combined image classification, storage and rapid visual content retrieval on a computer database. The method uses random combinatory information and involves sorting relevant information into categories and organizing it into data structures according to allocated indices.

International Patent Application WO 2004/061710 to Stauder et al. entitled "Process and Device for Access to Multimedia Elements by Means of Images Associated with These Elements" discloses a process for accessing multimedia elements. To access one of these elements, a first group of images associated with a first element is displayed, and means is provided for displaying a second group of images associated with at least one of these displayed images.

SUMMARY OF THE INVENTION

The present invention represents a method for browsing a collection of multimedia assets on a soft-copy display comprising:
a) receiving a collection of multimedia assets, each multimedia asset having a set of associated metadata;
b) defining an interest criterion;

c) using a processor to analyze the metadata associated with the multimedia assets and rank the multimedia assets according to the interest criterion;

d) displaying a portion of the multimedia assets on the soft-copy display according to the ranking;

e) interactively user selecting a displayed multimedia asset using a user interface;

f) updating the interest criterion based on the selected multimedia asset;

g) using a processor to determine an updated ranking of the multimedia assets according to the updated interest criterion; and h) displaying a portion of the multimedia assets on the soft-copy display according to the updated ranking.

This invention has the advantage that it provides an intuitive process for a user to browse a large collection of multimedia assets to identify multimedia assets satisfying an interactively-updated interest criterion. As the interest criterion evolves during the browsing process, the image display is updated to include new multimedia assets that reflect the updated interest criterion.

Another advantage of the invention is that it can take into account the number of similarly ranked related multimedia assets and limit the number of multimedia assets that are presented to the user in order to display other lower-ranked multimedia assets that that still may be of interest to the user.

It has the additional advantage of supporting multiple presentation formats enabling user selectable interaction options to adapt to the preferences of individual users.

It has the further advantage that the inclusion of randomly-selected multimedia asset provide a mechanism for the user to encourage sidetracking, thus providing a more serendipitous experience.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "multimedia asset", as used herein refers to any type of multimedia asset such as digital image files, digital video files and digital audio files.

Figure 1:
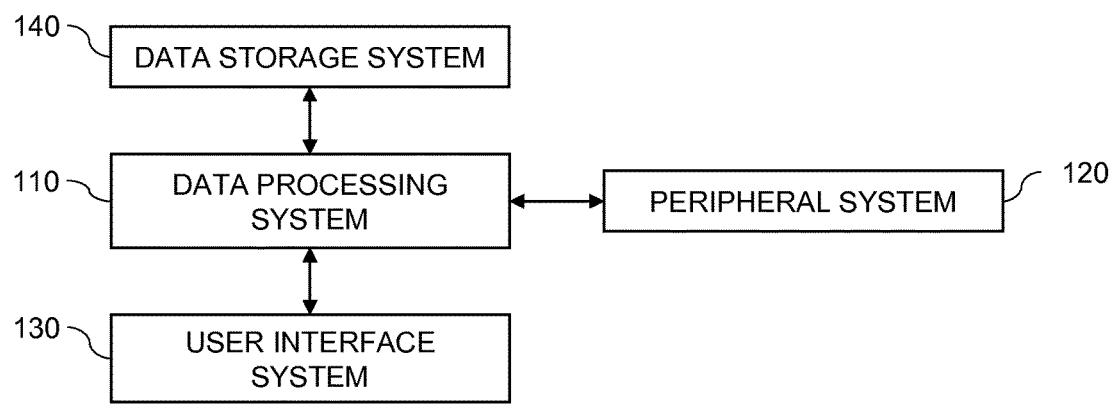
FIG. 1 is a high-level diagram showing the components of a system for browsing digital images according to an embodiment of the present invention.

FIG. 1 is a high-level diagram showing the components of a system for accessing and viewing multimedia collections according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a netbook, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2, which is a flow chart illustrating the process steps for browsing digital images. A rank multimedia assets step 204 is used to rank a multimedia asset collection 200 according to an interest criterion 202 provided by a user to produce a ranked multimedia asset collection 206. A display portion of multimedia collection step 208 produces a set of displayed multimedia assets 210, which is a subset of the ranked multimedia asset collection 206. Next, a user interface is provided to enable a user to identify a selected multimedia asset 214 using a select multimedia asset step 212. An update interest criterion step 216 is used to update the interest criterion 202 responsive to the selected multimedia asset 214, producing an updated interest criterion 218. The updated interest criterion 218 is then used by the rank multimedia assets step 204 to produce a new ranked multimedia asset collection 206, which is then used to produce an updated display. This process can be performed iteratively as desired by the user.

Each of the steps in the method of FIG. 2 will now be described in more detail. The multimedia asset collection 200 can contain a collection of digital images, digital video files, digital audio files, and other forms of multimedia content. The multimedia asset collection 200 can be multimedia assets owned by a particular user, or can include multimedia assets owned by a plurality of users. The multimedia asset collection 200 can be stored on one particular data storage system, or can include multimedia assets stored on a variety of different data storage systems to which the user has access. For example, images can be stored on servers that are accessible over the Internet or dispersed among multiple users' systems as with a peer-to-peer network.

The interest criterion 202 can be provided by text input from the user, by selection from a list of predefined criteria, from information obtained from a user profile, or by selecting a particular multimedia asset of interest to the user. The interest criterion 202 can relate to events, locations, peoples, time-frames, anniversaries, special occasions, or the visual appeal of an asset. For example, a user may specify that he is interested in viewing images of a particular person by typing the persons name into a search query, by selecting a name from a list of all known individuals in the multimedia asset collection, or by selecting an image containing the person of interest. If the user fails to provide an initial interest criterion 202, a default interest criteria can be provided. For example, a default interest criteria can be provided based on an interest criterion used in a previous session, or based on a generic interest criteria such as images having the most recent capture time.

The multimedia assets in the multimedia asset collection 200 are rank-ordered in rank multimedia assets step 204 from most to least relevant according to the specified interest criterion 202. The rank multimedia assets step 204 can use any method for ranking objects according to some criterion known to one skilled in the art. In one embodiment of the present invention, metadata associated with the multimedia assets is used to rank the multimedia assets using any ranking algorithm known to one skilled in the art.

Metadata useful in the ranking process is often stored as metadata tags associated with the multimedia asset file. Such metadata typically includes information obtained from the original capture device, such as time, date or location of image capture, camera settings, and other information associated with the device. It can also include metadata added by a user at the time of image capture, or at some later time.

Additional metadata can also be obtained by semantic or salient analysis of the multimedia asset. Such analysis can be used to determine many types of metadata including event type, number and size of faces in the image, identity of individuals in an image, objects contained in the image, distribution of colors in the image, similarity between images, and the general appeal of an image as determined by techniques including viewing dwell time and or frequency of viewing.

Examples of methods for automatically analyzing multimedia assets using semantic or salient analysis algorithms to obtain metadata useful for the rank multimedia assets step 204 would include the following. U.S. Pat. No. 6,847,733 to Savakis, entitled "Retrieval and Browsing of Database Images Based on Image Emphasis and Appeal" and U.S. Pat. No. 6,671,405 to Savakis, entitled "Method for Automatic Assessment of Emphasis and Appeal in Consumer Images," teach methods for determining the degree of importance, interest or attractiveness of an image.

U.S. Pat. No. 6,282,317 to Luo et al., entitled "Method for Automatic Determination of Main Subjects in Photographic Images," discloses a method for detecting a main subject in an image that includes identifying at least one structural saliency feature and at least one semantic saliency feature.

U.S. Pat. No. 6,804,684 to Stubler, entitled "Method for Associating Semantic Information with Multiple Images in an Image Database Environment," discloses a method of generating captions or semantic labels for an acquired image based upon similarity between the acquired image and one or more stored images.

U.S. Pat. No. 6,826,316 to Luo et al., entitled "System and Method for Determining Image Similarity," discloses a system and method for determining image similarity using perceptually significant features such as color, texture and shape.

U.S. Pat. No. 7,555,165 to Luo, entitled "Method for Semantic Scene Classification using Camera Metadata and Content-Based Cues," discloses a method for scene classification that includes extracting pre-determined camera metadata tags from the digital image and obtaining estimates of image class based on the extracted metadata tags.

U.S. Pat. No. 7,003,139 to Endrikhovski et al., entitled "Method for using Facial Expression to Determine Affective Information in an Imaging System," and U.S. Pat. No. 7,233,684 to Fedorovskaya et al., entitled "Imaging Method and System Using Affective Information," disclose methods for determining affective information for at least one image by monitoring facial expression of a user as the user views the digital image.

U.S. Pat. No. 7,271,809 to Fedorovskaya et al., entitled "Method for Using Viewing Time to Determine Affective Information in an Imaging System" discloses a method for determining affective information for at an image based on monitoring the viewing time.

U.S. Pat. No. 7,620,270 to Matraszek et al., entitled "Method for Creating and Using Affective Information in a Digital Imaging System" discloses determining a numeric categorization of images based on affective information.

In a preferred embodiment of the present invention, the well-known Dempster-Shafer combination algorithm is used for the ranking algorithm. (For more information on using the Dempster-Shafer combination algorithm to rank images, see the article by J. Urban et al. entitled "An Adaptive technique for content-based image retrieval" published in the journal Multimedia Tools and Applications, Vol. 31, pp. 1-28, 2006.) This approach combines evidence from different sources to arrive at a degree of belief, represented by a belief function, taking into account all the available evidence. For example, in the case that the initial interest criteria 202 specified that the user is interested in images of a particular person, the ranking algorithm would rank images containing that person more highly than those not containing the individual. In one embodiment of the present invention, images where the individual is alone would be ranked more highly than group shots containing that person, and images where the individual fills the image would be ranked more highly than images where the individual is standing in the background. Similarly, other factors can also be used to rank the images. For example, images that are determined to have high sharpness, high colorfulness and good contrast using objective analysis algorithms could be ranked higher than other images. Similarly, image that are analyzed using automatic algorithms and determined to have a high level of image value or general appeal, or images that were taken at a similar time and location to a highly ranked image could be ranked higher than other images.

The display portion of multimedia collection step 208 displays a portion of the ranked multimedia asset collection 206. Generally, the size or position of the displayed multimedia assets 210 are adjusted according to the ranking. In a preferred embodiment of the present invention, the displayed multimedia assets 210 are arranged in an ordered sequence, and wherein the highest ranked multimedia assets are displayed at the start of the ordered sequence.

Generally, a particular user interface may be limited to displaying a certain number of images. For example, if an image collection contains 1000 images, the user interface may be limited to displaying only a small fraction of those images (e.g., 30). In one embodiment of the present invention, the display portion of multimedia collection step 208 selects the most highly ranked multimedia assets in the ranked multimedia asset collection 206 as the displayed multimedia assets 210.

In a preferred embodiment of the present invention, the displayed multimedia assets 210 are displayed on a softcopy display as still or moving images, thumbnail images, or icons in patterns that intuitively reflect the rank status of the multimedia assets. As will be discussed in more detail later, there are many types of user interfaces that can be used to display the displayed multimedia assets 210. Various designs include spirals, matrices, "film strip" metaphors, lists, and the like. In some embodiments, the relative size of the displayed multimedia assets 210 can be modified to reflect the rank order status. For example, more highly ranked multimedia assets can be displayed with a larger size. Other special indicators such as graphical treatments, borders, colors, icons, or indicators can also be used as an indication of the relative rank of the multimedia assets.

In some cases, there may be a large number of highly ranked images in the ranked multimedia asset collection 206. For example, if the interest criteria simply specified that the user is interested in images that contain a particular individual, there may be a large number of images that contain that individual. In this case, it may be desirable to make sure that the displayed multimedia assets include a variety of different images. Therefore, rather than simply selecting the most highly ranked multimedia assets to be the displayed multimedia assets 210, the display portion of multimedia collection step 208 may take other factors into account. For example, it might randomly select images that have a ranking greater than some threshold value. Alternately, it might limit the number of images that are displayed that have a similar appearance or were captured at a similar time or location. In this way, it is possible to avoid the situation where all of the displayed multimedia assets 210 correspond to a single event, such as with a safari holiday that had been documented with hundreds of still images and video recordings.

Optionally, it may also be desirable to display a sampling of loosely-related or unrelated digital multimedia assets to provide a mechanism for the user to explore other parts of the multimedia asset collection as part of the image browsing process. For example, loosely-related multimedia assets that are somewhat lower ranked, but share one or more common metadata elements with a highly ranked multimedia asset (e.g., images captured at the same event as a highly ranked image) can be included in the displayed multimedia assets. In one embodiment of the present invention, the loosely-related multimedia assets can be displayed in the user interface near the end of the ranked sequence of images.

Similarly, unrelated multimedia assets can also be included in the displayed multimedia assets 210. In one embodiment of the present invention, the unrelated multimedia assets are included in the user interface in such a way that they can be clearly identified as being unrelated. For example, they can be scattered around the edge of the display window.

The inclusion of loosely-related and unrelated multimedia assets offers the user the option to focus in on a very specific event at a particular time, while at the same time offering other options to encourage sidetracking, thus providing a more serendipitous experience that attempts to emulate the established behavior of browsing through a shoebox of photographs with varying levels of organization.

The select multimedia asset step 212 can be carried out using any type of user interface known to one skilled in the art that will allow a user to select of the displayed multimedia assets 210. For example, the selection process can take the form of touching an asset of interest displayed on a touch screen display, using a pointing device (e.g., a mouse, a trackball, a keyboard, haptic game controller, or a tablet interface) and graphical icon to point to the asset, or using voice or gesture commands to select the multimedia asset of interest. The user has the option to select one of the highly-ranked multimedia assets, or optionally to select one of the loosely-related or unrelated multimedia assets.

At the update interest criterion step 216 the selected multimedia asset 214 is used to update the interest criterion 202, forming an updated interest criterion 218. In a preferred embodiment of the present invention, the interest criterion is updated by adding an additional factor that provides additional weight to multimedia assets that are similar to the selected multimedia asset. For example, the interest criterion can be updated to emphasize multimedia assets containing persons contained in selected multimedia asset, capture locations near to the selected multimedia asset or capture dates similar to the selected multimedia asset.

The interest criterion 202 is then updated to be equal to the updated interest criterion 218, and is then used by the rank multimedia assets step 204 to provide a new ranked multimedia asset collection 206. In a preferred embodiment of the present invention, the previously selected multimedia asset 214 will now be the most highly-ranked multimedia assets, and multimedia assets that are similar to the selected multimedia asset 214 will be more highly ranked than those that are dissimilar. The similarity could be relative to image appearance as determined by an image similarity algorithm, or alternately could be with respect to other aspects such as the image content, the number of people in the image, or the capture time and location. For Example, if the original interest criterion was specified to be images containing a particular individual and the user chooses a selected multimedia asset of that individual standing by the grand canyon with his wife, the highly-ranked images in the updated ranked multimedia collection 208 would include other images of the individual and his wife, as well as other images of the individual at the Grand Canyon, other images of the individual captured on that day and other pictures of the individual in outdoor locations.

The updated ranked multimedia asset collection 206 and then be used to select and display an updated set of displayed multimedia assets 210. As before, the displayed multimedia assets can include lower-ranked multimedia assets such as loosely-related multimedia assets or randomly selected multimedia assets. In one embodiment of the present invention, loosely-related multimedia assets are selected that share one or more attributes in common with the selected multimedia asset. For example, the one or more common attributes can include similar capture time, similar capture location, similar appearance, similar audio characteristics, or one or more common persons, objects, events or activities.

The user can then select a new multimedia asset and the process can be continued iteratively. With each successive iteration, the updated interest criterion 218 can include the factors from the previous interest criterion, together with the added criterion that the highly-ranked multimedia assets should be similar to the most recently selected multimedia asset 214. In a preferred embodiment of the present invention, the weight given to the most recently selected multimedia asset 214 is given a high weight, which the weight given to the previously selected multimedia assets decreases with each successive iteration.

This method of the present invention allows a user to hone in on images of interest. For example, if a user repeatedly selects images from the same location, the algorithm can increasing favor location as a measure, thus increasingly its weight in the ranking process and moving images captured in the same location higher in the rankings. This can allow the user to focus down into an area of the collection. However, to prevent the user from getting caught in a dead end, the method enables the user to branch off in new directions by continuing to display a selection of loosely-related and unrelated multimedia assets. Thus, the method of the present invention can respond in real time to a user's evolving interest which can permit the user follow a sidetrack into a completely different area of the collection.

Figure 3:
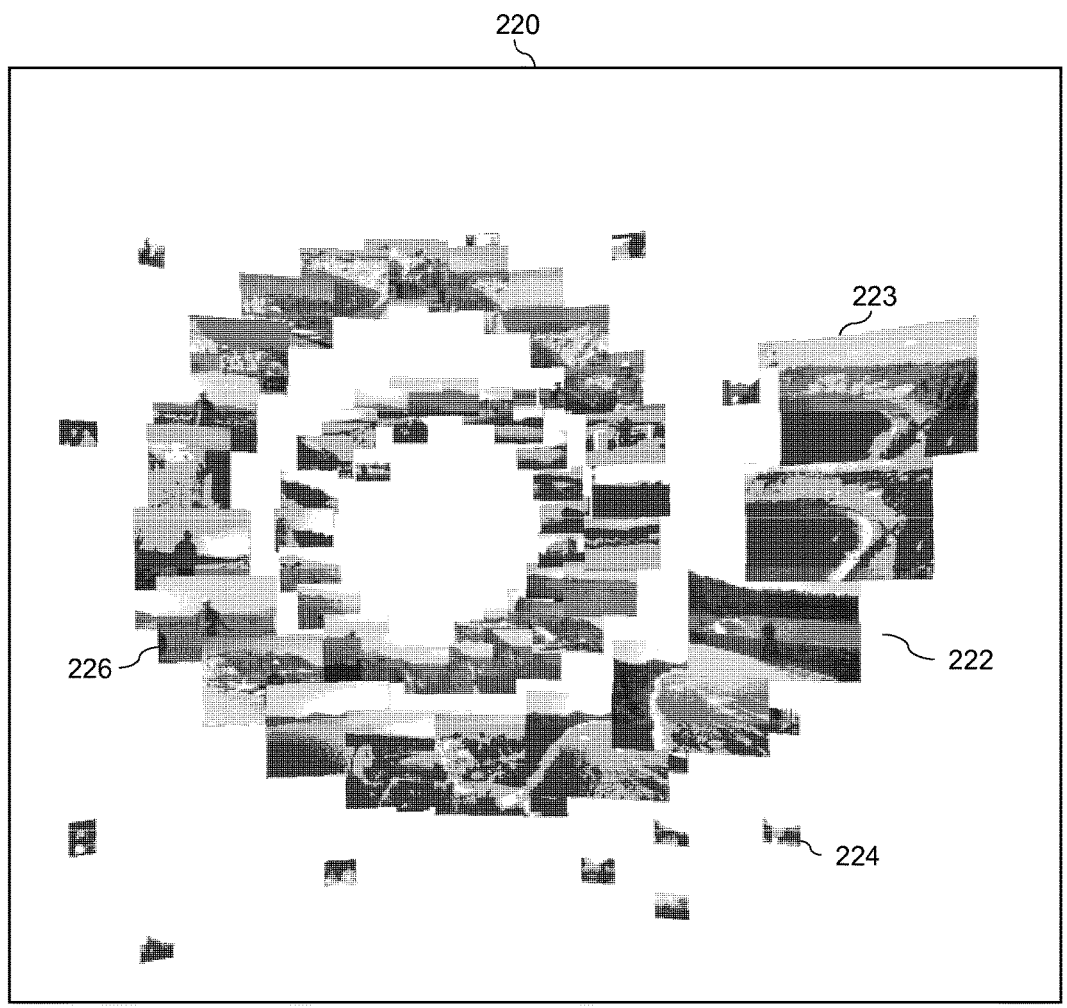
FIG. 3 is a graphical representation depicting a spiral formation of multimedia assets arranged in rank order together with a random selection of multimedia assets according to an embodiment of the present invention.

Referring now to FIG. 3, a graphical representation is shown depicting an initial spiral formation of multimedia assets 222 on a display screen 220. The initial spiral formation of multimedia assets 222 is arranged in a rank order in response to an initial interest criterion. The display screen 220 can be any type of display screen known to those skilled in the art, including color LCD, plasma, OLED, CRT, lenticular, barrier, projection, 3D or volumetric type displays. The display screen 220 can optionally include a touch sensitive surface to provide a touch screen interface. The display screen 220 is connected to a stationary or a portable device capable of providing multimedia content and responding to user interactions.

Within the initial spiral formation of multimedia assets 222, the largest of the images at the upper right end of the spiral formation represents the highest ranked multimedia asset 223. The lower-ranked multimedia assets are arranged sequentially around the spiral formation, with lower-ranked multimedia assets having a smaller size than higher-ranked multimedia assets, and being positioned in the background behind the higher-ranked multimedia assets. Other optional features not shown in FIG. 3 can also be included in the image display consistent with conventional content presentation system, such as menus and user interface controls for zooming and scrolling.

A selection of random multimedia assets 224 are also shown in a random arrangement scattered around the periphery of the spiral formation according to an embodiment of the present invention. The presentation of random multimedia assets 224 is optional and in a preferred embodiment of the present invention is a user selectable option that can be turned on or off depending on the type browsing experience in which the user wishes to engage.

Figure 2:
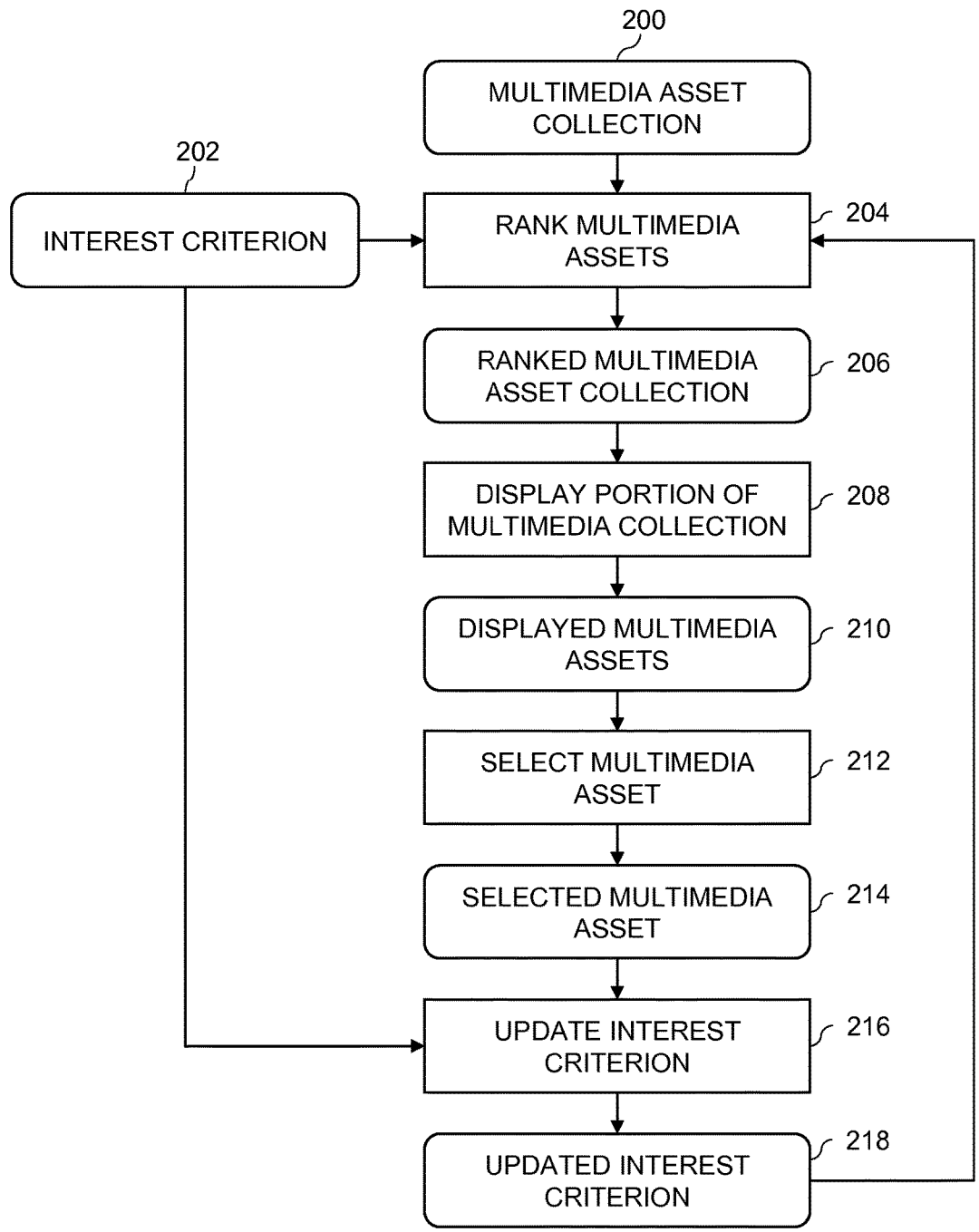
FIG. 2 is a flow chart illustrating the process steps for classifying digital images according to an embodiment of the present invention.

According to the present invention, a user interface is provided that allows the user to select one of the displayed multimedia assets using the select multimedia asset step 212 (FIG. 2). For example, the user can use a mouse or some other pointing device to click on a particular displayed multimedia asset, or can use a touch screen interface to touch a particular displayed multimedia asset. In this example, the user selects a selected multimedia asset 226, which is used by the update interest criterion step 216 (FIG. 2) to form an updated interest criterion 218 (FIG. 2).

Figure 4:
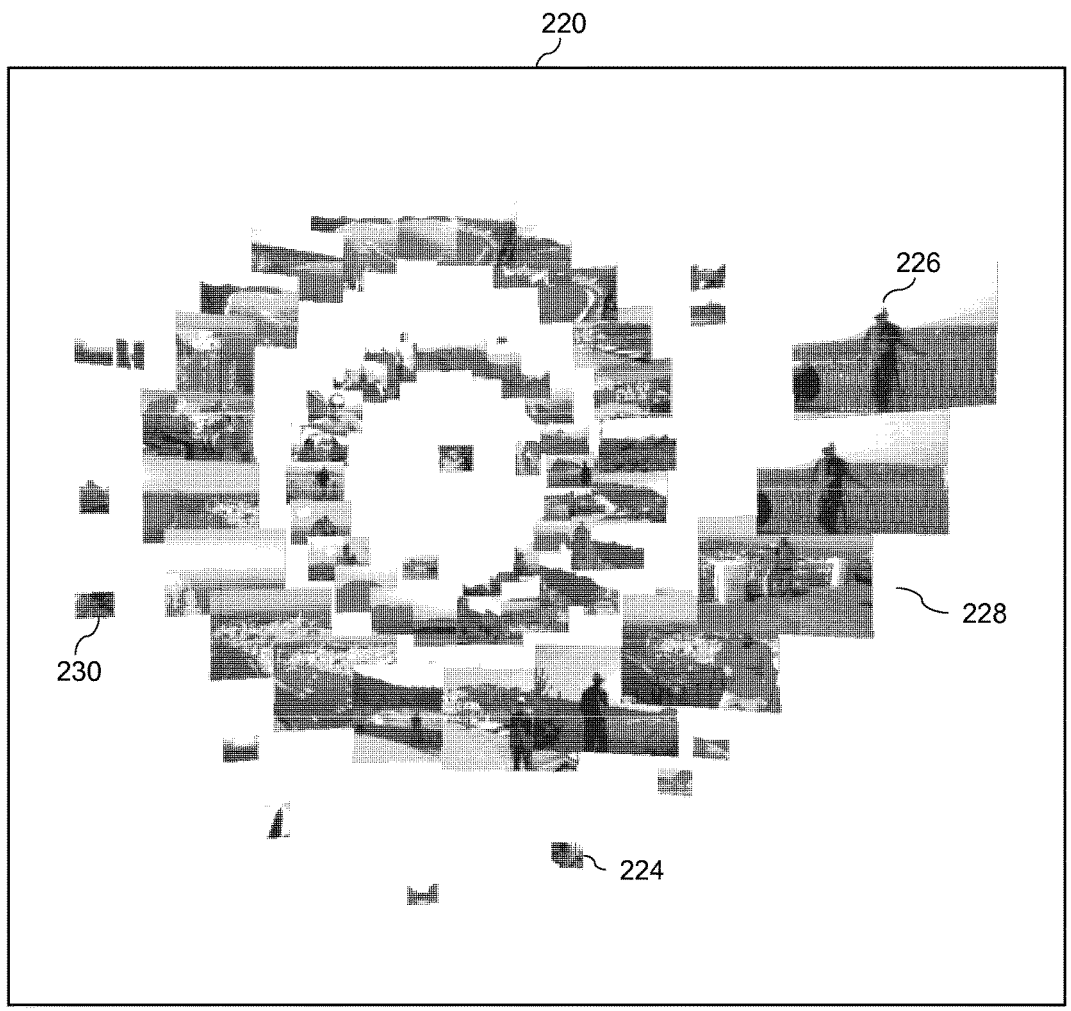
FIG. 4 is a graphical representation depicting a spiral formation of multimedia assets arranged in a first modified rank order.

Referring now to FIG. 4, a graphical representation is shown depicting an updated spiral formation of multimedia assets 228 arranged in first modified rank order in response to the updated interest criterion 218. The selected multimedia asset 226 which was selected by the user in FIG. 3 is now in the foreground and is positioned as the highest ranked multimedia asset in the spiral formation. In addition to the updated spiral formation of multimedia assets 228 a new selection of random multimedia assets 224 is also presented on display screen 220 according to an embodiment of the present invention. As discussed earlier, the random multimedia assets 224 offer opportunities to the user for sidetracking, thus enabling the user to jump in a new randomly chosen direction within the multimedia collection. In this example, the user chooses a new selected multimedia asset 230 from the displayed random multimedia assets 224. An updated interest criterion 218 (FIG. 2) is then determined responsive to this selection, and a new ranking for the multimedia asset collection is determined accordingly.

Figure 5:
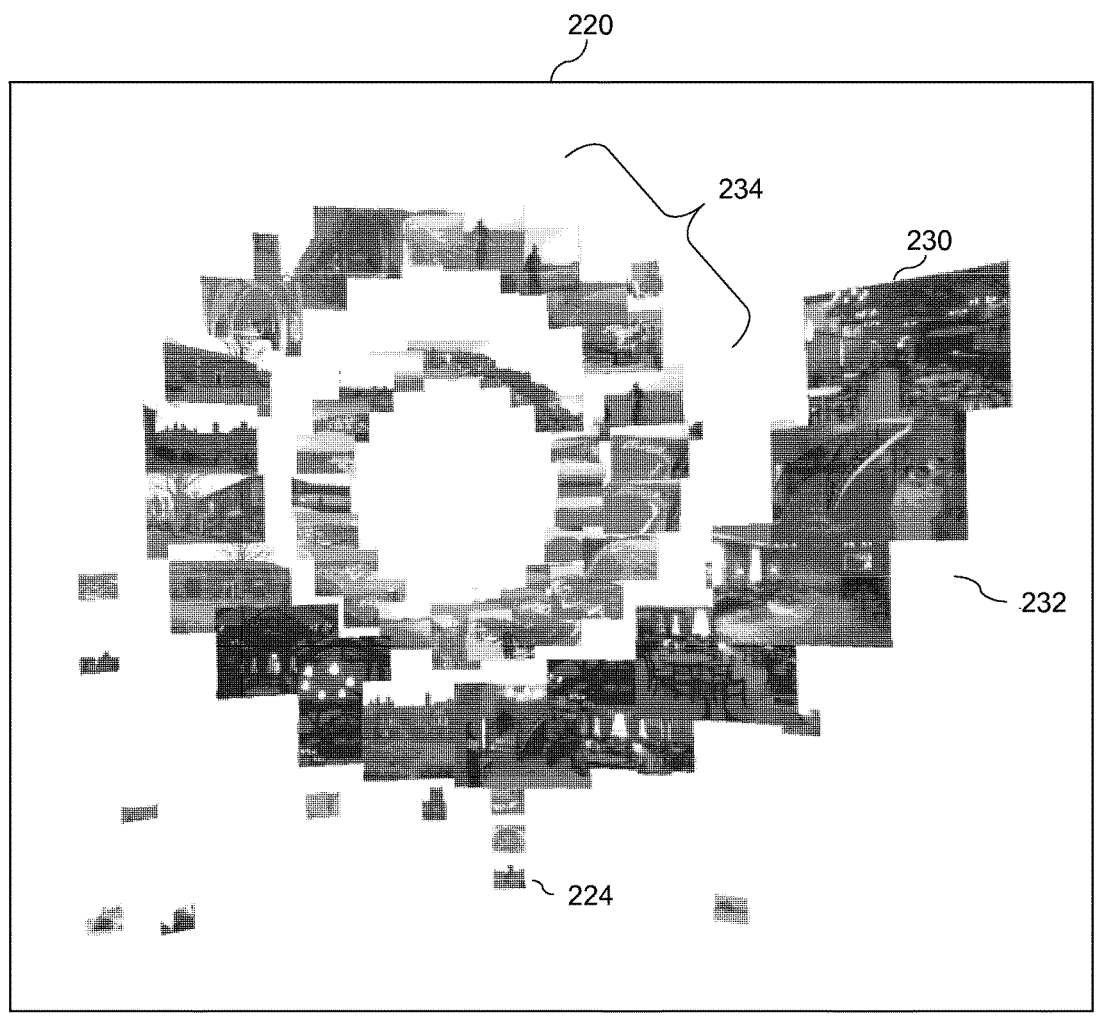
FIG. 5 is a graphical representation depicting a spiral formation of assets arranged in a second modified rank order.

Referring now to FIG. 5 a graphical representation is shown depicting an updated spiral formation of multimedia assets 232 arranged in second modified rank order in response to the updated interest criterion 218. The selected multimedia asset 230 which was selected by the user in FIG. 4 is now in the foreground and is positioned as the highest ranked multimedia asset in the spiral formation. The highest-ranked multimedia assets in the updated spiral formation of multimedia assets 232 are those that are determined to be similar to the selected multimedia asset 230. The updated spiral formation of multimedia assets 232 also includes a group of maintained multimedia assets 234 that were highly ranked according to the previous interest criterion in order to maintain a history of interest criterion used to get to the current manifestation of the asset collection. This reflects the fact that the update interest criterion step 216 still includes the previously selected multimedia assets at a lower weight. In one embodiment of the present invention, the most highly-ranked multimedia assets in the previous iteration are displayed whether or not they end up being highly ranked according to the updated interest criterion. The presence of the maintained multimedia assets 234 allows the user to return to the original interest area of the multimedia asset collection 200 (FIG. 2) after exploring the side-track. In addition to the updated spiral formation of multimedia assets 232 a new selection of random multimedia assets 224 is also presented on display screen 220 according to an embodiment of the present invention.

Figure 6:
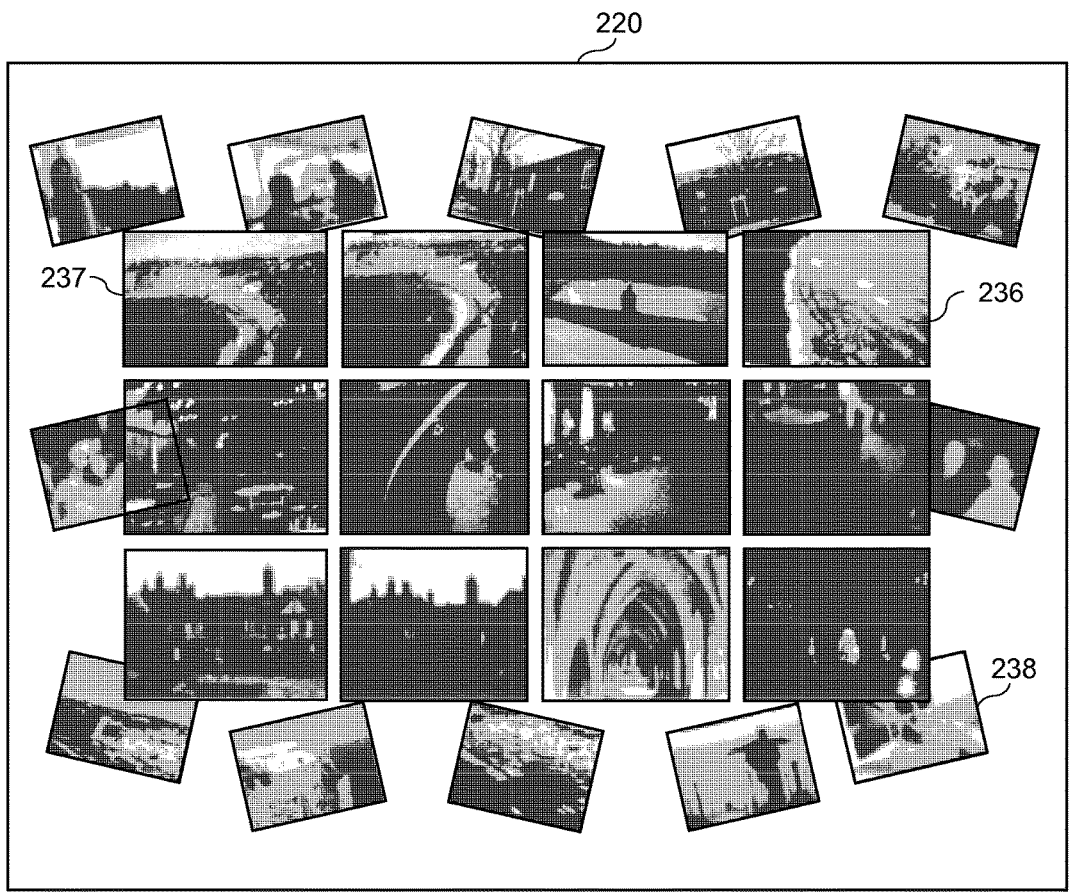
FIG. 6 is a graphical representation depicting rank-ordered multimedia assets arranged in a matrix format according to an embodiment of the present invention.

Referring now to FIG. 6 a graphical representation is shown depicting an alternate embodiment of the present invention where the rank-ordered multimedia assets are arranged using a matrix arrangement of multimedia assets 236. The highest ranked multimedia asset 237 is positioned in the upper left corner of the matrix arrangement of multimedia assets 236. Lower-ranked multimedia assets are displayed proceeding from left-to-right across the top row of the matrix arrangement, and on subsequent rows. A selection of random multimedia assets 238 are dispersed around the periphery of the rank-ordered assets on display screen 220 according to one embodiment of the present invention. In this example, the random multimedia assets 238 are presented slightly skewed to intuitively indicate that they are randomly selected assets. An optional scrolling feature (not shown) can also be used to scroll through the ranked multimedia asset collection 206 (FIG. 2), enabling the user to view more images from large multimedia asset collections.

Figure 7:
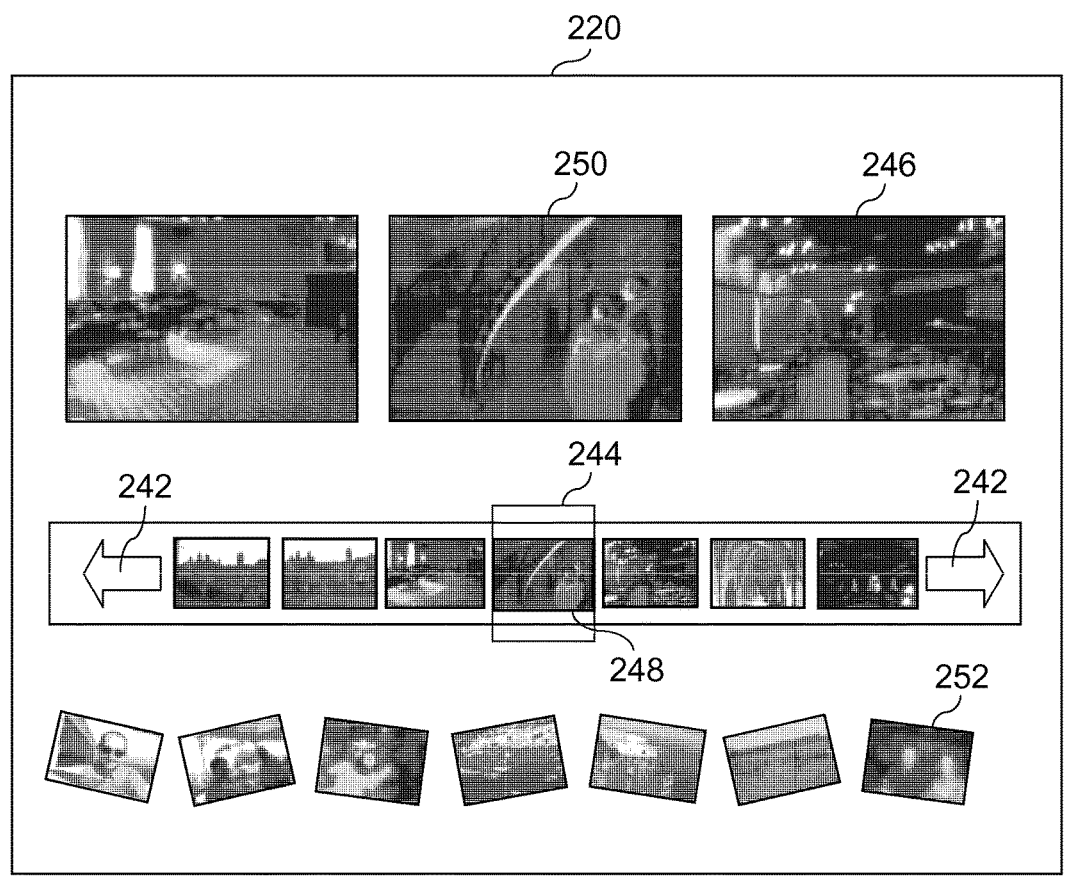
FIG. 7 is a graphical representation depicting rank-ordered multimedia assets with a "film strip" preview selector according to an embodiment of the present invention.

Turning now to FIG. 7, a graphical representation is shown depicting an alternate embodiment of the present invention where the rank-ordered multimedia assets 246 are displayed on display screen 220 using a "film strip" preview selector 240. The preview selector 240 includes directional user interface indicators 242 to scroll through the multimedia asset collection. A preview window icon 244 indicates the currently selected multimedia asset of interest. A previewed multimedia asset 248 is shown within the preview window icon 244 and is also shown in magnified form as magnified multimedia asset 250. In this example, the multimedia assets adjacent to the previewed multimedia asset 248 are also shown in magnified form. As a user interacts with the directional user interface indicators 242, the "film strip" containing the previewed multimedia asset 248 is scrolled through the ranked multimedia asset collection 206 (FIG. 2) and the magnified multimedia asset 250 is updated accordingly.

Optionally, random multimedia assets 252 can be presented adjacent to the preview selector 240. In this example, the random multimedia assets 252 are presented in a slightly skewed format to intuitively indicate that they are random assets. The random multimedia assets 252 also respond to the directional user interface indicators 242 and scroll along with the previewed multimedia asset 248 and the magnified multimedia asset 250.

Figure 8:
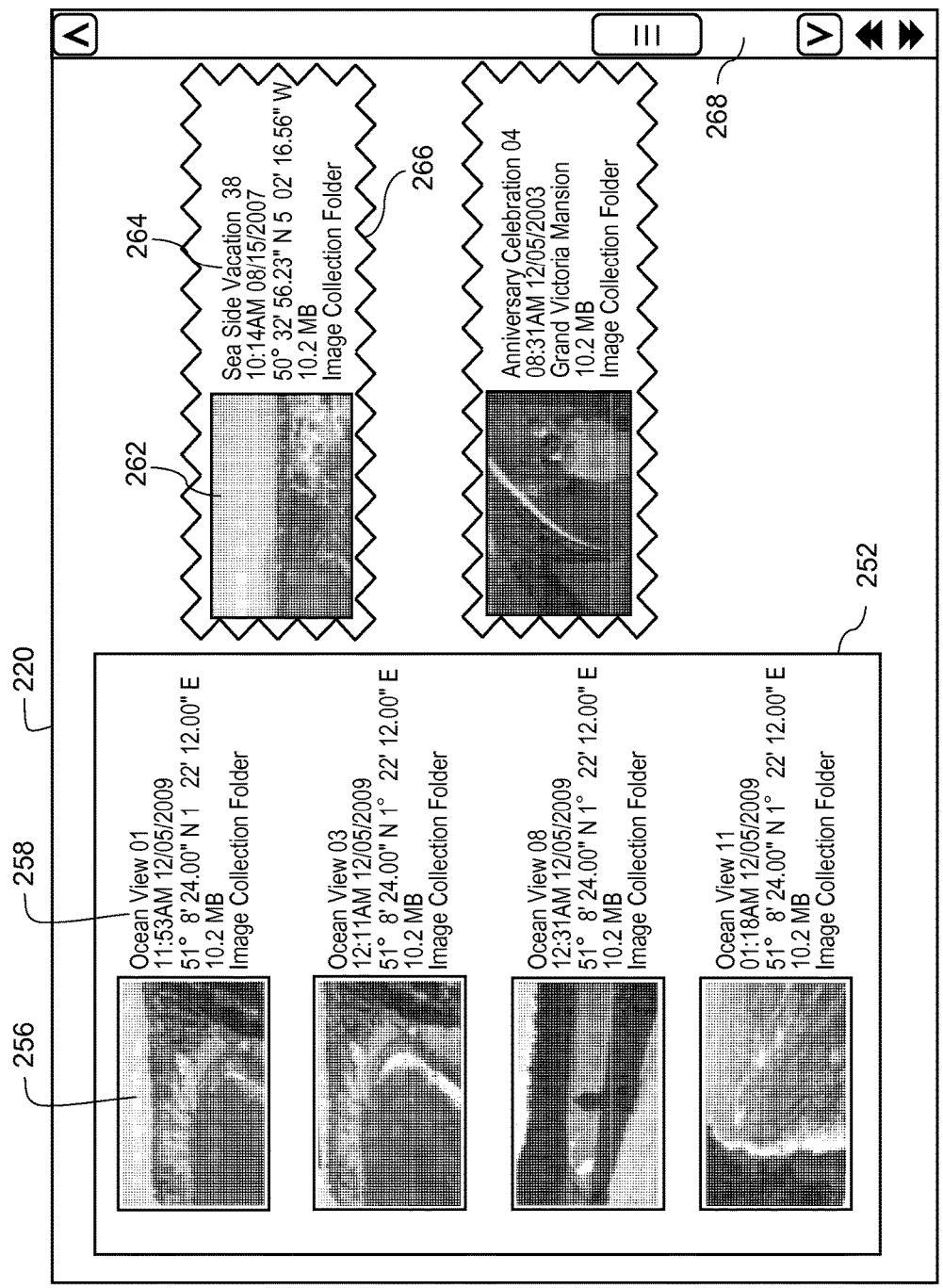
FIG. 8 is a graphical representation depicting rank-ordered multimedia assets in a list presentation format according to an embodiment of the present invention.

Referring now to FIG. 8, a graphical representation is shown depicting rank-ordered multimedia assets 256 in a rank-ordered list arrangement 254 on display screen 220 according to an alternate embodiment of the present invention. In the rank-ordered list arrangement 254, associated metadata 258 is presented adjacent to the rank-ordered multimedia assets 256 in order to provide additional information to the user regarding the rank-ordered multimedia assets 256. The associated metadata 258 can include information such as the file name, capture time/date, capture location, file size and file location. It will be obvious to one skilled in the art that many other types of associated metadata could also be displayed in accordance with the present invention. Also, to indicate that the rank-ordered multimedia assets 256 and associated metadata 258 are part of the list arrangement 254, a rank-ordered asset indicator 260 is included as a visible border surrounding the rank-ordered list arrangement 254. Optionally, random multimedia assets 262 can be presented adjacent to rank-ordered list arrangement 254 together with associated metadata 264. In addition, a random asset indicator 266 is shown as an alternative border style. In this example, the random asset indicator 266 surrounds only individual assets unlike rank-ordered asset indicator 260 which surrounds the entire visible portion of the list. Also included is a list scroll control user interface 268 which controls both the ranked ordered and random assets.

The spiral, matrix, film strip, and list presentation formats shown in FIGS. 3-8 represent examples of user selectable interaction options. It will be obvious to one skilled in the art that many other types of user interfaces can also be used in accordance with the present invention.

The present invention can be implemented as a computer program product and can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 multimedia asset collection
202 interest criterion
204 rank multimedia assets step
206 ranked multimedia asset collection step
208 display portion of multimedia collection step
210 displayed multimedia assets step
212 select multimedia asset step
214 selected multimedia asset step
216 update interest criterion step
218 updated interest criterion step
220 display screen
222 initial spiral formation of multimedia assets
223 highest-ranked multimedia asset
224 random multimedia assets
226 selected multimedia asset
228 updated spiral formation of multimedia assets
230 selected multimedia asset
232 updated spiral formation of multimedia assets
234 maintained multimedia assets
236 matrix arrangement of multimedia assets
237 highest-ranked multimedia asset
238 random multimedia assets
240 preview selector
242 directional user interface indicator
244 preview window icon
246 rank-ordered multimedia assets
248 previewed multimedia asset
250 magnified multimedia asset
252 random multimedia assets
254 rank-ordered list arrangement
256 rank-ordered multimedia assets
258 associated metadata
260 rank-ordered asset indicator
262 random multimedia assets
264 associated metadata
266 random asset indicator
268 list scroll control user interface

The invention claimed is:

1. A non-transitory computer readable medium encoded with a computer program, the program comprising instructions that when executed by a data processing device cause the data processing device to:
identify a collection of multimedia assets, each multimedia asset having metadata descriptive of the multimedia asset's content;
receive a user-defined interest criterion that corresponds to, at least in part, one or more factors relating to the metadata;
identify a first portion of multimedia assets from the collection of multimedia assets, the first portion comprising multimedia assets, wherein inclusion within the first portion is based, at least in part, on the interest criterion;
identify a second portion of multimedia assets from the collection of multimedia assets, the second portion comprising multimedia assets that are not related to the interest criterion;
rank, using a processor, the media assets in the first portion of multimedia assets based at least in part on the interest criterion;
display, in ranking order, at least some of the first portion of multimedia assets in a first region of a display;
display at least some of the second portion of multimedia assets in a second region of the display, wherein the first and second regions are disjoint;
select one of the displayed multimedia assets;
determine an updated interest criterion based, at least in part, on the interest criterion and metadata of the selected multimedia asset;
determine a new ranking, using the data processing device, of the multimedia assets based at least in part on the updated interest criterion;
identify a new first portion of multimedia assets from the collection of multimedia assets based, at least in part, on the updated interest criterion;
identify a new second portion of multimedia assets from the collection of multimedia assets that are not related to the interest criterion;
display, in new ranking order, at least some of the new first portion of multimedia assets in a new first region of a display; and
display at least some of the new second portion of multimedia assets in a new second region of the display, wherein the new first and new second regions are disjoint.

2. The non-transitory storage device of claim 1, wherein the instructions to cause the data processing device to select one of the multimedia assets comprise instructions to cause the data processing device to select one of the multimedia assets from the first portion.

3. The non-transitory storage device of claim 1, wherein the instructions to cause the data processing device to select one of the multimedia assets comprise instructions to cause the data processing device to select one of the multimedia assets from the second portion.

4. The non-transitory storage device of claim 3, wherein the interest criterion carries no weight in defining the updated interest criterion.

5. The non-transitory storage device of claim 1, wherein the metadata comprises semantic metadata determined by automatically analyzing the multimedia assets using a semantic analysis algorithm.

6. The non-transitory storage device of claim 1, wherein the instructions to cause the data processing device to display, in ranking order, at least some of the first portion of multimedia assets in a first region of a display comprise instructions to cause the data processing device to adjust the size or position of the displayed multimedia assets based, at least in part, on the ranking.

7. The non-transitory storage device of claim 6, wherein the instructions to cause the data processing apparatus to adjust the size or position of the displayed multimedia assets based, at least in part, on the ranking comprise instructions to cause the data processing apparatus to position, in an ordered sequence, the displayed assets, wherein the highest ranked multimedia assets are displayed at the start of the ordered sequence.

8. The non-transitory storage device of claim 7, wherein the ordered sequence is a spiral of overlapping images.

9. The non-transitory storage device of claim 7, wherein the ordered sequence comprises a matrix arrangement of multimedia assets having one or more rows.

10. A method for browsing a collection of multimedia assets on a display comprising:
identifying a collection of multimedia assets, each multimedia asset having metadata descriptive of the multimedia asset's content;
receiving an interest criterion that corresponds to, at least in part, one or more factors relating to the metadata;
identifying a first portion of multimedia assets from the collection of multimedia assets the first portion comprising multimedia assets, wherein inclusion within the first portion is based, at least in part, on the interest criterion;
identifying a second portion of multimedia assets from the collection of multimedia assets that are not related to the interest criterion;
ranking, using a processor, the media assets in the first portion of multimedia assets based at least in part on the interest criterion;
displaying, in ranking order, at least some of the first portion of multimedia assets in a first region of a display;
displaying at least some of the second portion of multimedia assets in a second region of the display, wherein the first and second regions are disjoint;
selecting one of the displayed multimedia assets;
determining an updated interest criterion based, at least in part, on the interest criterion and metadata of the selected multimedia asset;
determining a new ranking, using the data processing device, of the multimedia assets based at least in part on the updated interest criterion;
identifying a new first portion of multimedia assets from the collection of multimedia assets based, at least in part, on the updated interest criterion;
identifying a new second portion of multimedia assets from the collection of multimedia assets that are not related to the interest criterion;
displaying, in new ranking order, at least some of the new first portion of multimedia assets in a new first region of a display; and
displaying at least some of the new second portion of multimedia assets in a new second region of the display, wherein the new first and new second regions are disjoint.

11. The method of claim 10, wherein the selected multimedia asset is a multimedia asset from the first portion.

12. The method of claim 10, wherein the selected multimedia asset is a multimedia asset from the second portion.

13. The method of claim 12, wherein the interest criterion carries no weight in defining the updated interest criterion.

14. The method of claim 10, wherein the metadata comprises semantic metadata determined by automatically analyzing the multimedia assets using a semantic analysis algorithm.

15. The method of claim 10, further comprising adjusting the size or position of the displayed multimedia assets based, at least in part, on the ranking.

16. The method of claim 15, further comprising positioning, in an ordered sequence, the displayed assets, wherein the highest ranked multimedia assets are displayed at the start of the ordered sequence.

17. The method of claim 15, wherein the ordered sequence is a spiral of overlapping images.

18. A system comprising:
a display; and
one or more processors configured to perform operations comprising:
identifying a collection of multimedia assets, each multimedia asset having metadata descriptive of the multimedia asset's content;
receiving an interest criterion that corresponds to, at least in part, one or more factors relating to the metadata;
identifying a first portion of multimedia assets from the collection of multimedia assets, the first portion comprising multimedia assets, wherein inclusion within the first portion is based, at least in part, on the interest criterion;
identifying a second portion of multimedia assets from the collection of multimedia assets that are not related to the interest criterion;
ranking, using a processor, the media assets in the first portion of multimedia assets based at least in part on the interest criterion;
displaying, in ranking order, at least some of the first portion of multimedia assets in a first region of a display;
displaying at least some of the second portion of multimedia assets in a second region of the display, wherein the first and second regions are disjoint;
selecting one of the displayed multimedia assets;
determining an updated interest criterion based, at least in part, on the interest criterion and metadata of the selected multimedia asset;
determining a new ranking, using the data processing device, of the multimedia assets based at least in part on the updated interest criterion;
identifying a new first portion of multimedia assets from the collection of multimedia assets based, at least in part, on the updated interest criterion;
identifying a new second portion of multimedia assets from the collection of multimedia assets that are not related to the interest criterion;
displaying, in new ranking order, at least some of the new first portion of multimedia assets in a new first region of a display; and
displaying at least some of the new second portion of multimedia assets in a new second region of the display, wherein the new first and new second regions are disjoint.

* * * * *